(12) United States Patent
Bethscheider

(10) Patent No.: US 6,633,745 B1
(45) Date of Patent: Oct. 14, 2003

(54) SATELLITE CLUSTER COMPRISING A PLURALITY OF MODULAR SATELLITES

(75) Inventor: Gerhard Bethscheider, Ayl (DE)

(73) Assignee: Societe Europeenne des Satellites S.A., Luxembourg (LU)

(*) Notice: Subject to any disclaimer, the term of this patent is extended or adjusted under 35 U.S.C. 154(b) by 0 days.

(21) Appl. No.: 09/656,557

(22) Filed: Sep. 7, 2000

Related U.S. Application Data

(63) Continuation-in-part of application No. 09/537,125, filed on Mar. 29, 2000.

(51) Int. Cl.$^7$ ............................................. H04B 7/185

(52) U.S. Cl. .................... 455/12.1; 455/13.1; 455/13.2; 455/427; 455/430

(58) Field of Search ............................ 455/12.1, 13.1, 455/13.2, 427, 430, 431

(56) References Cited

U.S. PATENT DOCUMENTS

| | | | |
|---|---|---|---|
| 4,375,697 A | * 3/1983 | Visher | ......................... 455/13.1 |
| 4,691,882 A | 9/1987 | Young | |
| 5,372,340 A | 12/1994 | Ihara et al. | |
| 5,590,395 A | 12/1996 | Diekelman | |
| 5,615,407 A | 3/1997 | Barkats | |
| 5,678,175 A | * 10/1997 | Stuart et al. | ............. 244/158 R |
| 5,884,168 A | * 3/1999 | Kolev et al. | ................. 455/432 |
| 5,925,092 A | 7/1999 | Swan et al. | |
| 6,052,558 A | * 4/2000 | Cook et al. | ................. 455/12.1 |
| 6,064,859 A | 5/2000 | Leopold et al. | |
| 6,067,031 A | * 5/2000 | Janky et al. | .................. 340/903 |
| 6,075,497 A | * 6/2000 | Chen et al. | ................... 343/840 |
| 6,160,994 A | 12/2000 | Wiedeman | |
| 6,198,919 B1 | * 3/2001 | Buytaert et al. | ............. 455/426 |
| 6,285,316 B1 | * 9/2001 | Nir et al. | ................ 342/357.09 |
| 6,335,920 B1 | 1/2002 | Strodtbeck et al. | |

FOREIGN PATENT DOCUMENTS

| | | |
|---|---|---|
| DE | 19752876 A1 | 7/1998 |
| EP | 0541052 A1 | 5/1993 |
| EP | 0 751 632 A1 | 1/1997 |
| EP | 0 979 775 A2 | 2/2000 |
| FR | 2539102 | 7/1984 |
| GB | 2134353 A | 8/1984 |
| RU | 94018770/06 | 1/1996 |
| RU | 94040175/09 | 9/1996 |

OTHER PUBLICATIONS

Bellaccini, et al "Synchronization And Routing Aspects in a Cluster of Satellites with On–Board Processing" 1986 IEEE pp. 1713–1719.

Molette, et al "Technical and Economical Comparison Between a Modular Geostationary Space Platform and a Cluster of Satellites" pp. 771–784.

* cited by examiner

*Primary Examiner*—Vivian Chin
*Assistant Examiner*—Marceau Milord
(74) *Attorney, Agent, or Firm*—Wolf, Greenfield & Sacks, P.C.

(57) ABSTRACT

A satellite cluster and method for operating the same. A first module satellite has as a pay load component a receiver unit and/or a transmitter unit for communication with subscriber stations and/or base stations. A second module satellite has as a pay load component a signal processing unit for communication with subscriber and/or base stations. The signal processing unit is integrated in the second module satellite separately from the receiver and transmitter units of the first module satellite. Communication devices for the interaction of the pay load components are included in the module satellites. Each module satellite is controllable separately as an aerospace vehicle such that each respective module satellite is maneuverable out of the cluster and is replaceable by a new module satellite. In one module satellite, the signal processing unit may be integrated as a pay load component separately from the receiver and transmitter units.

36 Claims, 3 Drawing Sheets

SATELLITE CLUSTER COMPRISING A PLURALITY OF MODULAR SATELLITES

Figure 1:
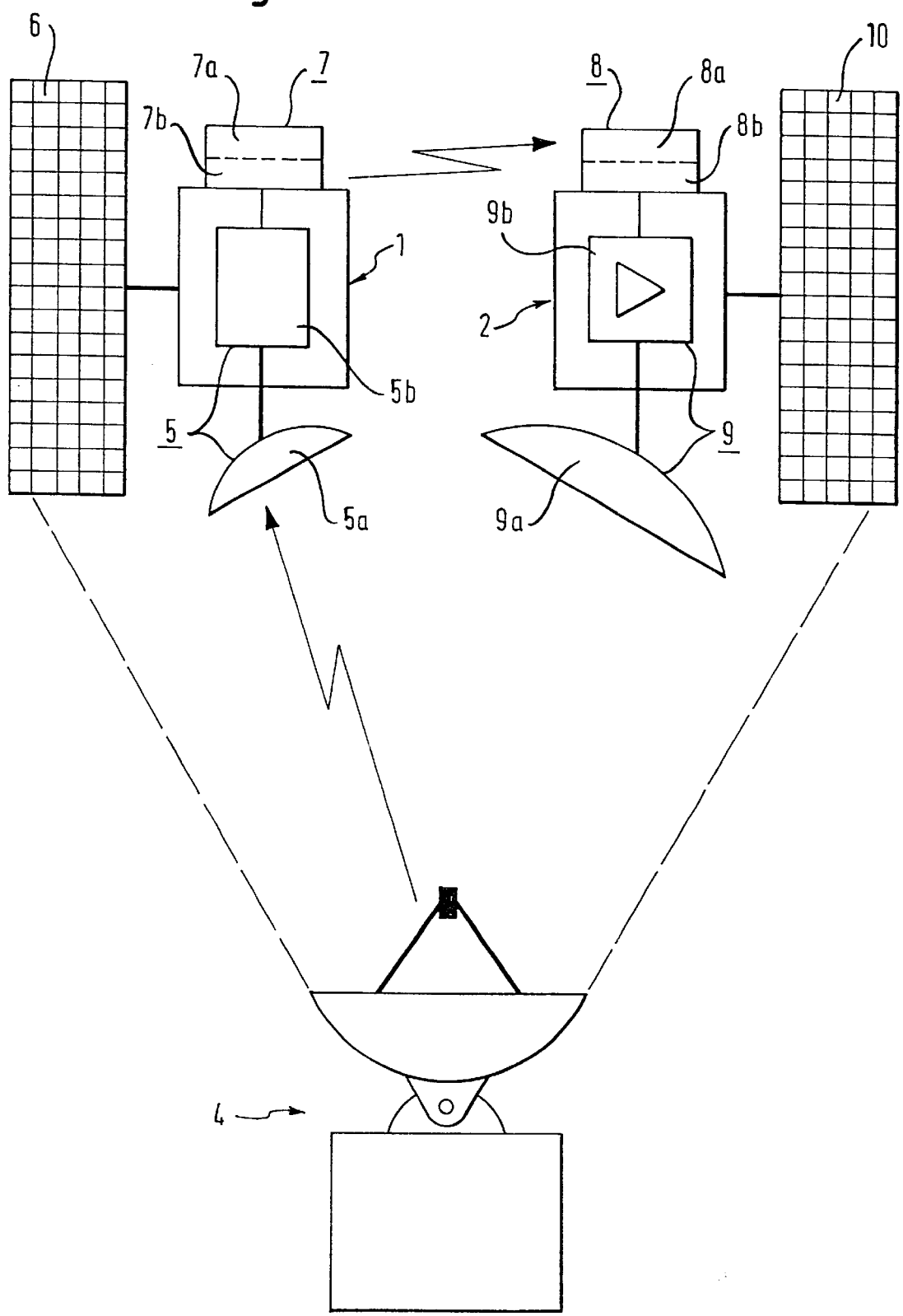

This application is a continuation-in-part of application Ser. No. 09/537,125, filed Mar. 29, 2000, entitled SATELLITE CLUSTER COMPRISING A PLURALITY OF MODULAR SATELLITES, and now pending.

The invention refers to a satellite cluster having at least two module satellites and a method for operating said satellite clusters.

Satellites in the conventional meaning are aerospace vehicles, which have a plurality of individual components, which are coordinated with each other, and are connected with each other to form a unit, to which for example the power supply, the state, position and temperature control, the telemetry, tracking and command sub—system (TT & C) and the transponder with the antenna system all belong as the pay load. The transponder comprises, as a rule, a receiver part, a processing part (on-board processor) and a transmitter part, each with its own antenna. These individual components, to which more can be added depending on the special application, are combined in an aerospace vehicle, i.e. the satellite in the conventional sense.

The performance requirements for telecommunications satellites, for example with respect to their transmitting power, the number of transponders/spare transponders and the frequency bands have the final result that satellites in the conventional sense are very large and they become very heavy. These satellites can only be launched with the most powerful and most costly carrier rockets (for example Ariane, Proton etc.). The efforts which are made to reduce the size and the weight of the satellites with a view to the launch are constantly countered by the increasing requirements, which as a rule are connected with an increase in the structure and a rise in the weight of the satellites in the conventional sense.

Against this background the problem on which the invention is based is to create a satellite, which does justice to the constantly growing demands on performance and which is more flexible in use.

This problem is solved by a satellite cluster according to claim 1 and a method for operating said cluster according to claim 6.

According to one aspect of the invention, the modular satellite consists of at least one first module satellite, which has a device for the supply of power, for the control of the state, the position and of the temperature and for the control of the track of the module satellite, as well as a first pay load component and a first communications device to transmit data and/or signals to another module satellite, and a second module satellite which has a device for power supply, for control of the state, the position and the temperature and for control of the track of the module satellite, as well as a second pay load component and a second communications unit to transmit data and/or signals to another module satellite.

In accordance with another aspect of the invention, the modular satellite also comprises a third module satellite which has a device for the power supply, for the control of the state, the position and the temperature and to control the track of the module satellite, as well as a third pay load component and a third communications unit to transmit data and/or signals to another module satellite.

An important advantage in accordance with the invention is linked with the service life of modern telecommunications satellites. These modern telecommunications satellites have a service life of up to 15 years. But certain key technologies have a very much shorter life such as, for example, the signal processing on board the satellite (on board processing). Whereas in the case of conventional satellites the obsolescence of the on board processing means at once that this satellite can not be used or can only be used with limitations for modern duties, the modular satellite as in the invention provides the possibility that the module satellites on which the on board processing is realised can be withdrawn and can then be replaced by a new module satellite, which takes over the processing of the signals.

Furthermore, by providing the individual pay loads in the individual satellites it is achieved that the module satellite concerned has a clearly smaller launch weight than a satellite in the conventional sense, in which the pay load components which are distributed in accordance with the invention to a plurality of modules are combined. If one observes the total weight of all the module satellites which provide jointly the functions of a satellite in the conventional sense, it is certainly higher than the weight of the conventional satellite. The clearly reduced launch weight of the individual module satellites, however, brings with it so many advantages with respect to the carrier rockets which are needed for the launch that the rise in the total weight is neither technically nor economically a genuine drawback. In addition, requirements are conceivable which a conventional satellite could only meet with a size which can no longer be launched.

According to one aspect of the invention, the communications units build a transmission route by means of laser beams between the module satellites. To do this, the communications units have a laser transmitter and a laser receiver device.

Alternatively or in addition the communications units build up by means of microwaves a transmission route between the module satellites (1, 2, 3). The communication units have for this purpose a microwave transmitter and a microwave receiver device.

According to another aspect of the invention, the pay load component of a first module satellite is a receiver unit which has at least one receiver antenna in order to receive signals and/or data. The first module satellite can then receive the necessary control commands from the base station via the receiver antenna of the reception unit.

The pay load component of a second module satellite can be a signal processing device for the processing of signals and/or of data. The pay load of a third module satellite is then a transmitting antenna for sending signals and/or data via at least one transmitter antenna. The third module satellite can receive the necessary control commands from a base station (4) via the transmitting antenna of the transmitter device (11).

The three pay load components, i.e. the receiver device, the signal processing device and the transmitter device of the three module satellites which are equipped in accordance with the invention are only usable due to their interaction. The receiver unit of the first module satellite receives a signal which was sent out from a base station and transmits it to the signal processing device of the second module satellite, by which the processed signal is transmitted to the transmitter unit of the third module satellite.

The cluster satellites, which are collocated at the same geo-stationary orbital position, are controlled by one or more satellite ground control stations, which form integral part of the cluster satellite concept. Depending on the number of collocated cluster satellites, these satellite ground control stations manoeuvre the satellites safely and fuel efficiently by using one of the following collision risk strategies:

Longitude separation strategy

Eccentricity vector strategy

Inclination and eccentricity vector strategy

The collocation status of all cluster satellites must be continuously monitored via the satellite ground control stations by using highly accurate ranging and orbit determination tools such as trilateration ranging and interferometry.

In the following, the operating principles of each of these strategies are identified.

1. Longitude Separation Strategy

Cluster satellites are merely separated in longitude, therefore the number of modules which can be safely collocated is relatively small. Longitude separation works by ensuring that one dimension is separated at all times, namely longitude. In practice, however, the inclination vector differences will provide for additional separation most of the time, effectively creating latitude separation as well. The distance separation in longitude is ideally constant and can be expressed by the formula:

$$D = r \sin(\Delta\lambda).$$

North-south coupling, east-west manoeuvre dispersion and changing values of position uncertainty (sometimes seasonally depending) reduce the impressiveness of this method of collocating cluster satellites.

2. Eccentricity Vector Strategy

A radial and longitudinal separation is achieved by merely offsetting the eccentricity vectors of the orbit of each cluster satellite. More specifically, this strategy requires each cluster module to have different arguments of perigee.

The satellite ground control stations direct the eccentricity vectors of the cluster modules to different positions in inertial space while leaving their magnitudes the same. The satellite ground control stations ensure the eccentricity vector strategy by continually re-targeting these vectors to maintain the separation and do not allow transgression beyond a certain tolerance.

Unlike the longitude separation strategy, the distance between satellites will vary over the course of the orbit. There will be a relative phase difference in longitude liberation equal to the vector separation angle. The minimum distance will occur along the radial dimension and the maximum is in longitude. Since the orbits of the cluster modules are assumed to be in the same plane (though in practice they would probably not) there is no latitude separation.

3. Inclination, Eccentricity Separation Strategy

While the longitude separation depends on only one dimension to guarantee distance between satellites and the eccentricity vector strategy makes use of two dimensions, the inclination and eccentricity strategy employs all three dimensions. The satellite ground control stations collocate the cluster satellites by adding on top of the eccentricity strategy an inclination vector offset between all satellites, by this causing a separation in latitude.

In order to collocate cluster satellites based on the three strategies described above, the satellite ground control stations must apply a stringent and continuous monitoring of all cluster modules, positions. Practically spoken, this means that the distance separations and relative orientations for all cluster combinations must be projected forward in time to determine, if corrective manoeuvres are needed. This demands high accuracy for the post manoeuvre orbit. The satellite ground control stations must be able to perform corrective manoeuvres whenever required. This implicitly means that the satellite ground control stations have to have the means to determine the need, plan and implement such manoeuvres in short time. Furthermore, the satellite ground control stations must have the capability to execute two or more manoeuvres nearly simultaneously. The offline satellite ground control systems shall have the capability to compute distance separation and relative orientation of all collocated cluster satellites, which are important to calculate to estimate risk of collision and/or occultation. The ground systems shall be able to rapidly test the effects of small manoeuvre variations in the manoeuvre planning stage. The orbits of new cluster modules must be carefully phased to the collocation strategy. After the inter-satellite link has been established and is functional, traffic is switched and routed between the cluster modules.

Figure 2:
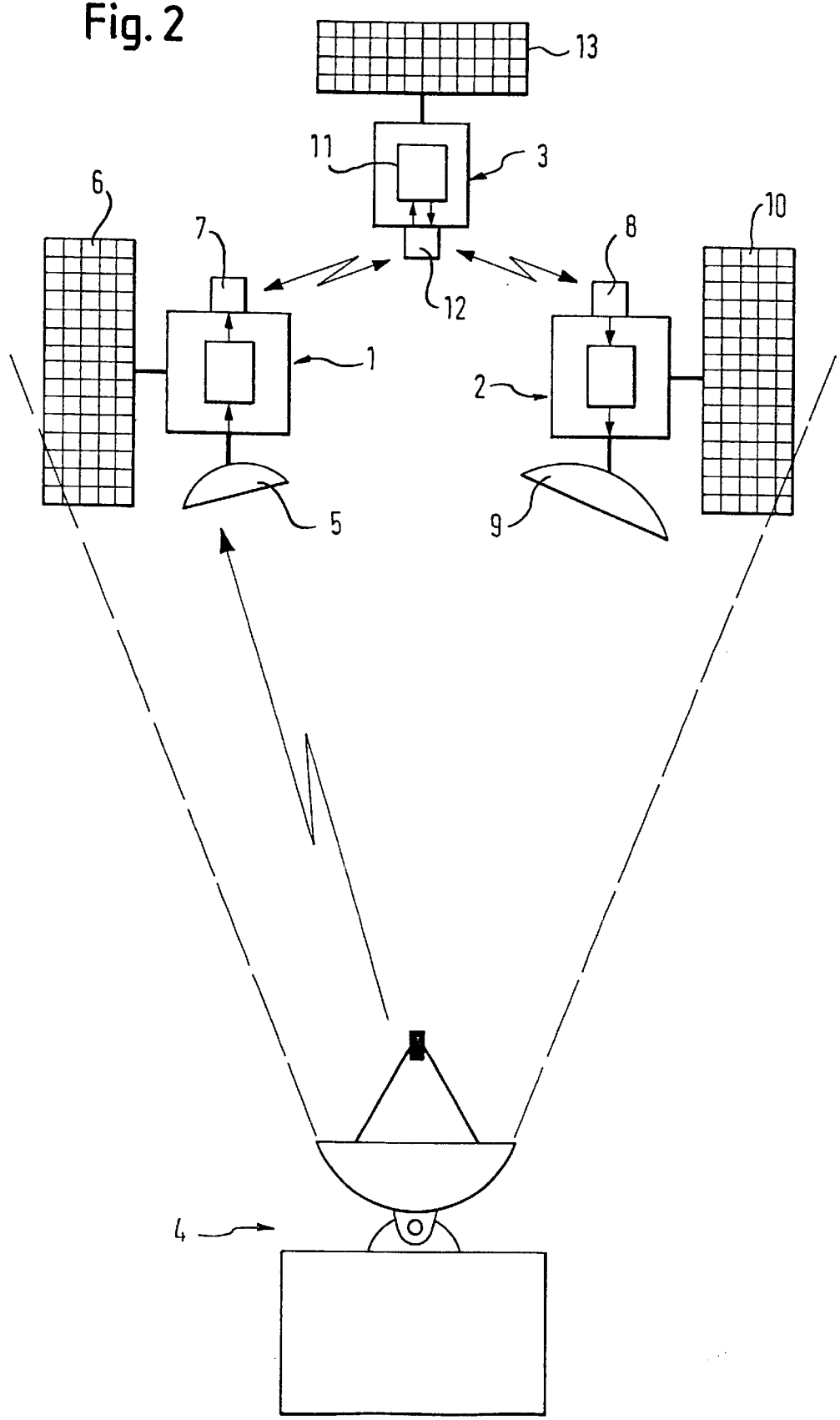
Figure 3:
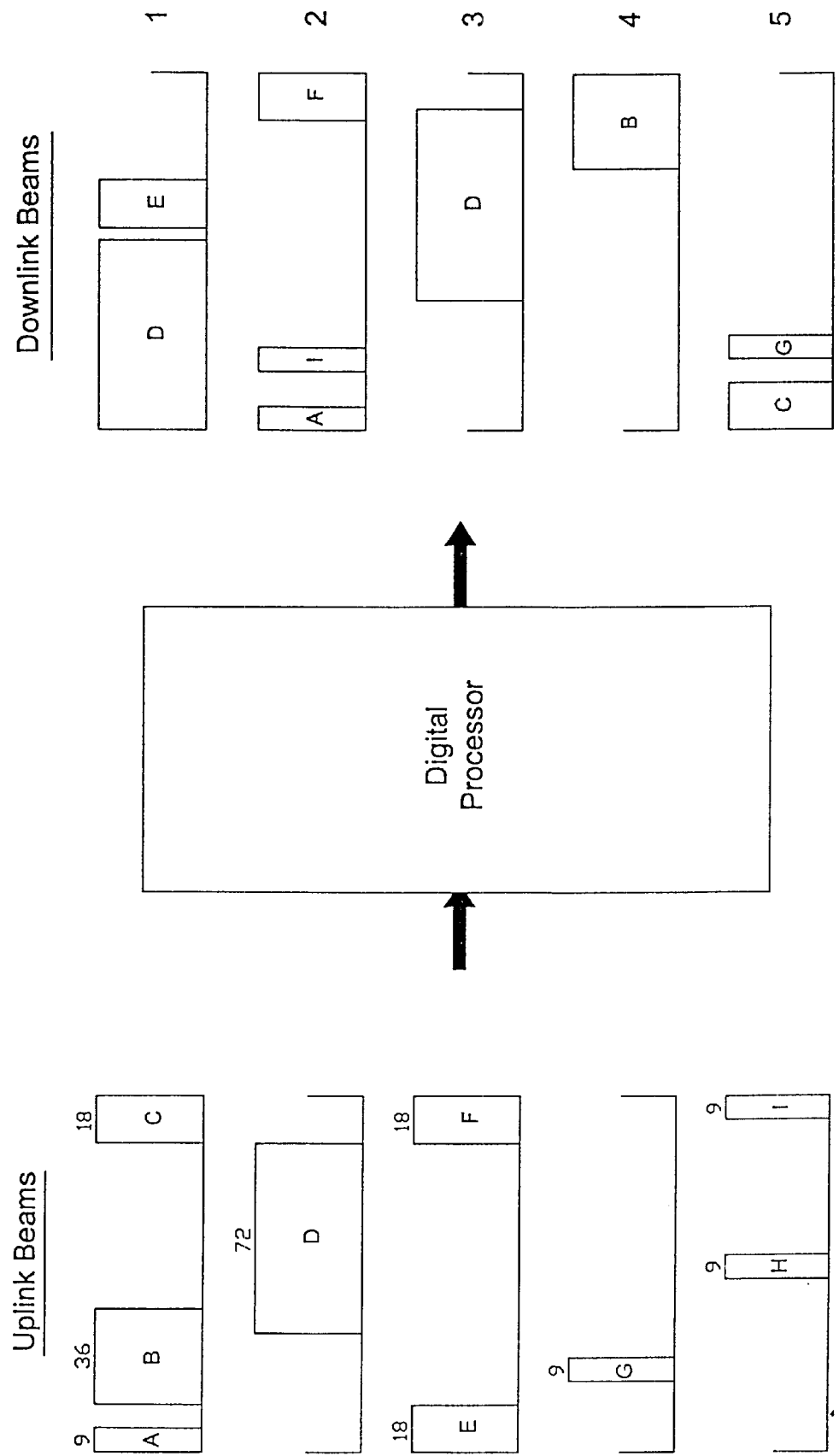

The invention will be explained below on the basis of an example of an embodiment while making reference to the drawings, which show the following:

FIG. 1 a first example of an embodiment of a modular satellite which consists of two module satellites, FIG. 2 a second example of an embodiment of a modular satellite which consists of three module satellites and FIG. 3 an example of an uplink/downlink frequency plan which is processed by a satellite module having a signal processing unit.

In FIG. 1 a first example of an embodiment of a modular satellite in accordance with the invention is shown, in which two module satellites 1, 2 are provided. The first module satellite of the example of an embodiment is designed as a receiver unit for the signals which are sent out from a base station 4 (up link). It has a receiver unit 5, to represent which in FIG. 1 the receiver antenna 5a and the input amplifier 5b are shown. In addition, the first module satellite 1 is equipped with all the other components which are needed to make out of it an independent aerospace vehicle, which can be controlled by a base station, for example by base station 4. For these components, which were already mentioned as examples above, in FIG. 1 the sun sail 6 is shown to represent them. In particular this concerns the power supply, the state, position and temperature control and the TT & C sub—system (telemetry, tracking and command).

In accordance with the invention the first module satellite 1 has a first communications device 7, by which a communications channel can be established to a second module satellite 2. This second module satellite 2 has in addition a second communications device 8, via which the data can be exchanged and/or signals can be transmitted with or to the first module satellite 1 via the first communications device 7. The first and the second communications devices consist of a first transmitter unit 7a and of a first receiver unit 7b and/or a second transmitter unit 8a and a second receiver unit 8b.

The second module satellite 2 comprises in the first example of an embodiment a transmitter unit 9, which is represented in FIG. 1 in the first place by the transmitter antenna 9a, but it also includes inter alia a transmitter amplifier 9b, which usually has a moving field tube (TWGT). The second module satellite 2 is equipped, like the first module satellite 1, with all the necessary components, which make a separate aerospace vehicle out of the second module satellite 2, which can also be controlled for example from the base station 4. Just as in the case of the module satellite 1, in FIG. 1 to represent these components of the second module satellite, only the sun sail 10 is shown, which stands for the components which were already mentioned above.

In accordance with the invention, the two module satellites 1, 2 only form jointly from the point of view of the base station 2 a usable satellite with the receiver unit 5 and the transmitter unit 9. A signal which is sent out from the base station 4 is received by the receiver unit 5 of the first module satellite and is transmitted via the first communications device 7 to the communications device 8 of the second module satellite 2. The transmitter unit 9 of the second module satellite 2 then sends the signal to earth.

If faults appear in the module satellites, which consist in this example of an embodiment in accordance with the invention of the module satellites 1 and 2, the module satellite which is affected can be manoeuvred out of the combined operation, as in accordance with the invention, the two module satellites are aerospace vehicles which can be controlled independently and can be replaced by a new module satellite which has the corresponding pay load components. In accordance with the concept of the invention it is only necessary to manoeuvre the module satellite which is to be replaced out of the combined operation and to replace it by a new satellite.

On the basis of the technology which is available today in the TT & C field, it is possible without any difficulty to position two or more module satellites in direct proximity to each other or at a desired spacing from each other in orbit.

In FIG. 2 a second example of an embodiment of a modular satellite in accordance with the invention is shown, in which there are three module satellites 1, 2, 3. The first module satellite 1 of this example of an embodiment is designed as a receiver for the signals (up link) which are sent out by a base station 4. It has a receiver unit 5, which is represented by the receiver antenna shown in FIG. 1. In addition, the first module satellite 1 is equipped with all the other components, which are needed to make out of it an independent aerospace vehicle, which can be controlled from a base station, for example base station 4. The sun sail 6 which is shown in FIG. 2 represents these components, which were already listed above as examples. This concerns in particular the power supply, the state, position and temperature control and the telemetry, tracking and command (TT & C) sub—system.

The second module satellite 2 has in the second example of an embodiment a transmitter device 9, which is shown in FIG. 2 to be represented in the first place by the transmitter antenna, but of which also inter alia a transmitter amplifier, usually with a moving field tube (TWGT), forms a part. The second module satellite 2 is equipped just as is the first module satellite 1 with all the components which are required to make out of the module satellite an independent aerospace vehicle, which can be controlled for example from the base station 4. Just as in the case of the module satellite 1, in FIG. 2 these components of the second module satellite 2 are represented solely by the sun sail 10, which stands for the components which were already mentioned above.

In the example of an embodiment as in FIG. 2, there is a third module satellite, which for example has as its pay load a signal processing device 11 (on board processor), to which the signals received by a third communications device 12 of the third module satellite 3 are sent. This third communications device 12 receives signals/data from the first communications device 7 of the first module satellite. The signal processing unit 11 processes the signals and sends the processed signals via the third communications device 12 of the third module satellite 3 to the second module satellite 2 via its communications unit 8. The third module satellite 3 is equipped, just like the first module satellite 1, with all the necessary components which make out of the module satellite an independent aerospace vehicle, which can be controlled for example from the base station 4. As in the case of the module satellite 1, in FIG. 2 these components of the third module satellite 3 are represented solely by the sun sail 13, which stands for the components which were already mentioned above.

In accordance with the invention, the three module satellites 1, 2, 3 of this example of an embodiment only form jointly a satellite which is usable from the point of view of the base station 4, with a receiver unit, a signal processing device and a transmitter unit. A signal sent out from base station 4 is received by the receiver unit 5 of the first module satellite 1 and is transmitted via the communications device 7 and via the communications device 12 of the third module satellite 3. From there the signal arrives at the signal processing device 11, by which the signal is then sent out via the communications device 12 to the communications device 8 of the second module satellite 2. The transmitter unit 9 of the second module satellite 2 sends the signal to earth.

When the requirements for signal processing in the course of the service life of the modular satellite, which in this example of an embodiment in accordance with the invention consists of the module satellites 1, 2 and 3 are to be changed, the second module satellite 2 can be manoeuvred out of the combined operation, because in the case of the module satellite 2 it is in accordance with the invention an independently controllable aerospace vehicle, and it can then be replaced by a new module satellite with a signal processing device. The same applies to the first module satellite 1 and to the third module satellite 3, which as in the case of the second module satellite 2 can also be replaced in the event of faults or of the expiry of its service life. Corresponding to the concept in accordance with the invention, it is only necessary to manoeuvre the module satellite out of the combined operation and to replace it by a new module satellite.

The modular satellite in accordance with the invention provides a more effective redundancy concept, because not only can defective module satellites be exchanged, but in addition individual module satellites can be repaired in an economical manner as a precaution. The concept in accordance with the invention offers more flexibility than the known conventional concepts for satellites. Thus functions can be added or withdrawn at any time. Technologically obsolete modules can be supplemented or replaced. The service life of the satellite and technological progress can therefore be coordinated. But it is also important that complex satellites which cannot be realised today in the conventional sense in accordance with the concept of the invention can be built in modular form and can be assembled in orbit to form a functioning unit. Modules can be co-positioned at the same place in orbit or they can be placed at different orbital positions. Due to the concept in accordance with the invention, spot beam satellites can also be provided in a simple manner, which illuminate certain zones on the ground and to which the corresponding signals are sent out via the communications device provided in each case.

The communications devices 7, 8 and 9 of the module satellites 1, 2 and 3 of the examples of embodiments which are shown in FIGS. 1, and 2 can be realised in different ways. For example a transmission route can be established which is based on laser beams or on microwaves. In view of the very short distances, only minor amounts of power have to be made available for these additional transmission and receiving processes.

In contrast to the examples of embodiments which are described above, a modular satellite in accordance with the invention can also be realised with more than two or three module satellites. Which pay load is to be carried by the module satellites can be judged at choice and defined in accordance with technical and economic criteria. The decisive factor is that from the point of view of the base station, the modular satellite in accordance with the invention only makes available the desired functions due to the interaction between the module satellites.

An advantageous difference from the second example of an embodiment is that the receiver device 5, which in the second example of an embodiment is arranged on the first module satellite (1), and the transmitter device (9) which is arranged on the second module satellite can also be combined on a (first) module satellite. The module satellite (3) which makes the signal processing available is then a further (second) module satellite of the modular satellite in accordance with the invention. If the requirements for the signal processing (on board processing) change, this module satellite can and must be replaced, whereas the long service life transmitter and receiver devices are further employed.

On the third module satellite of the second example of an embodiment which is shown in FIG. 2, it is preferable to provide a receiver antenna for the TT & C signals, which are sent out from the base station for the control of the module satellite.

The first and second module satellites 1 and 2 which are shown in accordance with FIGS. 1 and 2 in the examples of embodiments can receive the control signals from the base station via the receiver antenna of the receiver device 5 and/or via the transmitter antenna of the transmitter device 9. But as a rule, the module satellites in accordance with the invention have the antennae which are known from conventional satellites for the reception or for the transmission of TT & C data or signals. These antennae are often described as omniantennae because they have all-round characteristics. For after decoupling from the carrier rocket, it is not certain that the main transmitter and receiver antenna is aligned so that the satellite can be controlled from the base station. After the positioning in orbit has been completed, the main antenna can be used for telemetry, tracking and control purposes.

FIG. 3 shows an example of an uplink/downlink frequency plan which is processed by a satellite module having a signal processing unit.

Digital on-board processing is going to form an increasingly important element in future communication satellite payloads and supports flexible on-board traffic routing and demand based capacity allocation.

Signals are transmitted to the satellite cluster and are received and processed by one or more satellite modules, of the foresaid satellite cluster configuration. Individual channels are accessing the satellite cluster using SCPC or FDMA, TDMA or CDMA access schemes and from different locations via multi-beam or single beam reception antennas of the receiving satellite modules.

The digital on-board-processors of the satellite cluster include demodulators, demultiplexers, switches, multiplexers, modulators and traffic manager software in order to regenerate, to switch and to multiplex the data as received from the different locations. Such on-board processors are called "regenerative on-board processors" or in conjunction with multi-beam receive/transmit antennas "regenerative multi-beam on-board processors" and provide inter-beam routing functionality and fast packet switching (like ATM, IP . . . ) to support single hop interconnectivity.

The processed and multiplexed data stream is down linked via multi-beam or single beam antenna systems of one or more satellite modules of the satellite cluster.

The functionality which is supported by the foresaid "regenerative multi-beam on-board processors" of the satellite cluster modules is the following:

1. Combining of signals from different uplink stations/sites which are received via multi-beam or single beam antennas from one or more satellite modules of the satellite cluster.
2. Data regeneration, switching and multiplexing.
3. Demand based capacity allocation. The satellite cluster capacity is dynamically based upon user requests and a flexible allocation of capacity between point to point and broadcast applications is supported. Also the receive coverage can be managed dynamically. The on-board processor supports full meshed connectivity, allowing to switch channels/traffic from "any site to any site" (inter-beam routing). Switching of channels and beams is therefore done on an individual basis (flexible routing).
4. On-board traffic management and collection of billing raw data.
5. On-board processor supports bursty and constant bit rate applications.
6. Data formatting compatible with accepted downlink standards (MPEG, DVB . . . )
7. Supports packet switching, circuit switching and frame switching.

FIG. 3 shows an example of an uplink/downlink frequency plan of a cluster satellite regenerative multi-beam OBP architecture based on five uplink and downlink beams.

Another family of on-board processors which could also be carried on board of cluster satellites are DVB on-board processors, which re-multiplex different uplink channels into one or more DVB downlink transport streams. Uplink signals are received by one or more cluster satellites, routed to the on-board processor for remultiplexing; the transport streams are routed to one or more cluster satellites for their subsequent downlink.

What is claimed is:

1. A satellite cluster having at least two module satellites co-positioned at the same geo-stationary orbital position, comprising:

a first module satellite, having a receiver unit for receiving signals which are sent out by an earth station and/or having a transmitter unit for sending signals back to earth and having a first communication device for interacting with communication devices of other module satellites; and a second module satellite, having a signal processing unit and having a second communication device for interacting with communication devices of other module satellites, wherein the second communication device receives signals from the first communication device for processing by the signal processing unit, and wherein the second communication device forwards the processed signals to the communication device of at least one other module satellite, and wherein each module satellite is controllable separately as an aerospace vehicle by an earth station such that each respective module satellite is maneuverable out of the cluster and is replaceable by a new module satellite.

2. The satellite cluster according to claim 1, wherein the receiver unit has a receiver antenna and the transmitter unit has a transmission antenna and wherein the receiver unit and the transmitter unit are integrated in different module satellites.

3. The satellite cluster according to claim 1, wherein the signal processing unit combines signals of different first module satellites received by the second communication device.

4. The satellite cluster according to claim 1, wherein the signal processing unit performs data regeneration, switching and multiplexing on the signals received by the second communication device.

5. The satellite cluster according to claim 1, wherein the signal processing unit performs demand based capacity allocation on the signals received by the second communication device.

6. The satellite cluster according to claim 1, wherein the signal processing unit performs inter-beam routing on the signals received by the second communication device.

7. The satellite cluster according to claim 1, wherein the first communication device and the second communication device are based on a communication by laser beams.

8. The satellite cluster according to claim 1, wherein the first communication device and the second communication device are based on a communication by microwaves.

9. A method of operating a satellite cluster having at least two module satellites co-positioned at the same geo-stationary orbital position,
   with a first module satellite, having a receiver unit for receiving signals which are sent out by an earth station and/or having a transmitter unit for sending signals back to earth and having a first communication device for interacting with communication devices of other module satellites,
   with a second module satellite, having a signal processing unit and having a second communication device for interacting with communication devices of other module satellites,
   wherein the second communication device receives signals from the first communication device for processing by the signal processing unit, and wherein the second communication device forwards the processed signals to the communication device of at least one other another module satellite, and
   the method comprising a step of:
      controlling each module satellite separately as an aerospace vehicle by an earth station such that each respective module satellite is maneuverable out of the cluster and is replaceable by a new module satellite.

10. The method according to claim 9, wherein the earth station controls a corresponding module satellite on the basis of a longitude separation strategy.

11. The method according to claim 9, wherein the earth station controls a corresponding module satellite on the basis of an eccentricity vector strategy.

12. The method according to claim 9, wherein the earth station controls a corresponding module satellite on the basis of an inclination and eccentricity vector strategy.

13. A satellite cluster having at least two module satellites co-positioned at the same geo-stationary orbital position, comprising:
   a first module satellite, having a first receiver unit for receiving signals which are sent out by an earth station and/or having a transmitter unit for sending signals back to earth and having a first communication device for interacting with communication devices of other module satellites; and
   a second module satellite, having a signal processing unit and having a second receiver unit for receiving signals which are sent out by an earth station and having a second communication device for interacting with communication devices of other module satellites,
   wherein the second receiver unit receives signals from the earth station for processing by the signal processing unit, and wherein the second communication device forwards the processed signals to the communication device of at least one other module satellite, and
   wherein each module satellite is controllable separately as an aerospace vehicle by an earth station such that each respective module satellite is maneuverable out of the cluster and is replaceable by a new module satellite.

14. The satellite cluster according to claim 13, wherein the first receiver unit has a receiver antenna and the transmitter unit has a transmission antenna and wherein the first receiver unit and the transmitter unit are integrated in different module satellites.

15. The satellite cluster according to claim 13, wherein the signal processing unit combines signals of different earth stations received by the first receiver unit.

16. The satellite cluster according to claim 13, wherein the signal processing unit performs data regeneration, switching and multiplexing on the signals received by the first receiver unit.

17. The satellite cluster according to claim 13, wherein the signal processing unit performs demand based capacity allocation on the signals received by the first receiver unit.

18. The satellite cluster according to claim 13, wherein the signal processing unit performs inter-beam routing on the signals received by the first receiver unit.

19. The satellite cluster according to claim 13, wherein the first communication device and the second communication device are based on a communication by laser beams.

20. The satellite cluster according to claim 13, wherein the first communication device and the second communication device are based on a communication by microwaves.

21. A method of operating a satellite cluster having at least two module satellites co-positioned at the same geo-stationary orbital position,
   with a first module satellite, having a first receiver unit for receiving signals which are sent out by an earth station and/or having a transmitter unit for sending signals back to earth and having a first communication device for interacting with communication devices of other module satellites,
   with a second module satellite, having a signal processing unit and having a second receiver unit for receiving signals which are sent out by an earth station and having a second communication device for interacting with communication devices of other module satellites,
   wherein the second receiver unit receives signals from the earth station for processing by the signal processing unit, and wherein the second communication device forwards the processed signals to the communication device of at least one other module satellite, and
   the method comprising a step of:
      controlling each module satellite separately as an aerospace vehicle by an earth station such that each respective module satellite is maneuverable out of the cluster and is replaceable by a new module satellite.

22. The method according to claim 21, wherein the earth station controls a corresponding module satellite on the basis of a longitude separation strategy.

23. The method according to claim 21, wherein the earth station controls a corresponding module satellite on the basis of an eccentricity vector strategy.

24. The method according to claim 21, wherein the earth station controls a corresponding module satellite on the basis of an inclination and eccentricity vector strategy.

25. A satellite cluster having at least two module satellites co-positioned at the same geo-stationary orbital position, comprising:
  a first module satellite, having a receiver unit for receiving signals which are sent out by an earth station and/or having a first transmitter unit for sending signals back to earth and having a first communication device for interacting with communication devices of other module satellites; and
  a second module satellite, having a signal processing unit and having a second transmitter unit for sending signals back to earth and having a second communication device for interacting with communication devices of other module satellites,
  wherein the second communication device receives signals from the first communication device for processing by the signal processing unit, and wherein the second transmitter unit sends the processed signals back to earth, and
  wherein each module satellite is controllable separately as an aerospace vehicle by an earth station such that each respective module satellite is maneuverable out of the cluster and is replaceable by a new module satellite.

26. The satellite cluster according to claim 25, wherein the receiver unit has a receiver antenna and the first transmitter unit has a transmission antenna and
  wherein the receiver unit and the first transmitter unit are integrated in different module satellites.

27. The satellite cluster according to claim 25, wherein the signal processing unit combines signals of different first module satellites received by the second communication device.

28. The satellite cluster according to claim 25, wherein the signal processing unit performs data regeneration, switching and multiplexing on the signals received by the second communication device.

29. The satellite cluster according to claim 25, wherein the signal processing unit performs demand based capacity allocation on the signals received by the second communication device.

30. The satellite cluster according to claim 25, wherein the signal processing unit performs inter-beam routing on the signals received by the second communication device.

31. The satellite cluster according to claim 25, wherein the first communication device and the second communication device are based on a communication by laser beams.

32. The satellite cluster according to claim 25, wherein the first communication device and the second communication device are based on a communication by microwaves.

33. A method of operating a satellite cluster having at least two module satellites co-positioned at the same geo-stationary orbital position,
  with a first module satellite, having receiver unit for receiving signals which are sent out by an earth station and/or having a first transmitter unit for sending signals back to earth and having a first communication device for interacting with communication devices of other module satellites,
  with a second module satellite, having a signal processing unit and having a second transmitter unit for sending signals back to earth and having a second communication device for interacting with communication devices of other module satellites,
  wherein the second communication device receives signals from the first communication device for processing by the signal processing unit, and wherein the second transmitter unit sends the processed signals back to earth,
  the method comprising a step of:
    controlling each module satellite separately as an aerospace vehicle by an earth station such that each respective module satellite is maneuverable out of the cluster and is replaceable by a new module satellite.

34. The method according to claim 33, wherein the earth station controls a corresponding module satellite on the basis of a longitude separation strategy.

35. The method according to claim 33, wherein the earth station controls a corresponding module satellite on the basis of an eccentricity vector strategy.

36. The method according to claim 33, wherein the earth station controls a corresponding module satellite on the basis of an inclination and eccentricity vector strategy.

* * * * *